Oct. 16, 1928. 1,688,222
C. C. ANDERSEN
HORSE DRAWN RAKE
Filed July 23, 1926
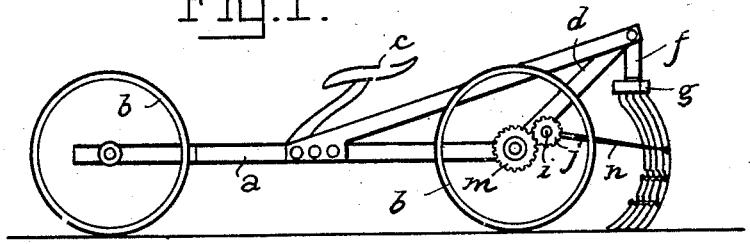
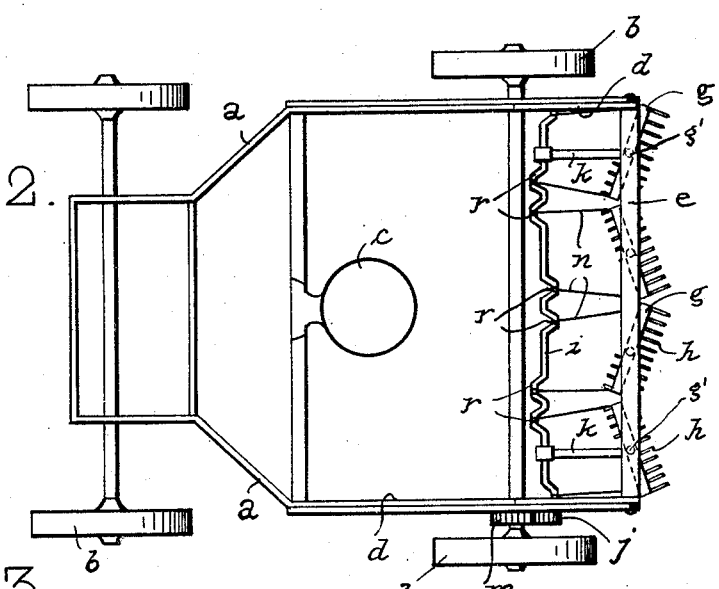
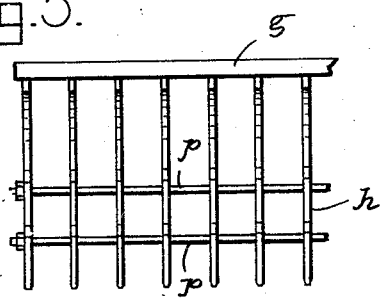
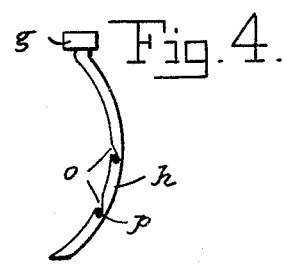
Carl Christian Andersen
By Harry Cohn
atty.

Patented Oct. 16, 1928.

1,688,222

UNITED STATES PATENT OFFICE.

CARL CHRISTIAN ANDERSEN, OF VIERNE MARK PR. GAMBY, DENMARK.

HORSE-DRAWN RAKE.

Application filed July 23, 1926, Serial No. 124,389, and in Denmark November 28, 1925.

The present invention refers to an arrangement for horse-drawn rakes and comprises teeth which can be fitted into any desired number of rods or holders which rotate in a horizontal plane and are put into operation by means of connecting rods associated with a crank-shaft which rotates when the machine is working, so that the teeth holders of the rake and hence the teeth of the rake are moved backwards and forwards revolving around vertical axle pins during the working of the machine. The teeth of the rake which can be raised or lowered in a manner which in itself is known, for example, from the driver's seat, so that they work either in the ground or above it, can be employed for clearing the ground of stones and field couch grass or for raking together hay and straw according to the depth in which the rake teeth work. The connecting rods go from the crank-shaft to the teeth of the rake and can be fastened to the latter at various heights, so that when the rakes are employed for collecting stones they are fixed low down on the teeth by which means the latter are reinforced. On the other hand if the rakes are to be employed for weeding, the rods can be fixed higher up on the teeth. If the rakes are employed for raking together hay and straw, the connecting rods can be fixed at the top of the teeth of the rake which in this case are working over the surface of the ground. If the rakes are employed for collecting stones or clearing couch grass, extra teeth can be employed and fixed to removable transverse rods going between the teeth of the rake. The teeth of the rake which can be constructed of bent flat iron are screwed into the holders or fastened in any other suitable way to the holders, so that they are easily exchangeable.

The invention is represented on the drawing in one method of execution, and in this Fig. 1 shows the machine viewed from the side, Fig. 2 shows the same viewed from above, Fig. 3 is a front view of one of the holders and the rake teeth secured thereto; and Fig. 4 is an end view of the same.

$a$ is the main frame of the machine provided with running wheels $b$ and a driver's seat $c$. Between the rods $d$ which extend backwards from the main frame there is a transverse rod $e$ which carries for example, any desired quantity of vertical rods $f$. On the lower end of the latter, holders $g$ for the rake teeth are pivotally mounted on vertical axle pins $g'$ and can be revolved laterally, and into the holders the rake teeth $h$, which for example are made of bent flat iron, are screwed. A crank-shaft $i$ which has a toothed or cog wheel $j$ has bearings in bars $k$ leading for example from the rods $f$ or the rod $e$ and is in mesh with cog wheel $m$ on the rear running wheel axle or on the hub of the rear wheel. The crank-shaft $i$ has two cranks $r$ for each tooth holder $g$ and each crank is connected by means of connecting rods $n$, with for example, the outermost of the rake teeth on each holder $g$. As the machine is being driven the holders $g$ are moved backwards and forwards by the connecting rods which can be connected with the rake teeth by any suitable means (not shown) and the holders revolve around the axle pins whereby they assume for example the position shown in Fig. 2. The wheels $m$ and $j$ can be disengaged from each other by means of a disengaging lever of any suitable type (not shown). The teeth which can be of the form shown in Figures 3 and 4 have inclined recesses $o$ for cross rails $p$, which serve for strengthening the rake teeth. The machine can be constructed in many designs and with various numbers of revolving holders $g$ if the principle of the invention is adhered to. The cranks $r$ must be as short as possible, so that the holders of the rake teeth are given small quick lateral movements. By means of these lateral movements it is possible to make the teeth work free from the ground if the machine is being employed as a cultivating implement or stone collector.

Having now described my invention, what I claim and desire to secure by Letters Patent is—

1. A raking machine comprising in combination a main frame, running wheels thereon, rearwardly extending supports, a plurality of holders pivotally mounted on said supports for movement in a horizontal plane, rake teeth carried by said holders, a crank shaft, means for rotating the crank shaft by the running wheels of the raking machine, and connecting rods connected to the crank shaft and to the ends of said holders for moving said holders in a horizontal plane.

2. A raking machine comprising in combination a main frame, running wheels thereon, rearwardly extending supports, a plurality of holders pivotally mounted on said supports for oscillatory movement, rake teeth carried by said holders, a crank shaft mounted in said frame, means for rotating said crank shaft by the running wheels of the raking machine, and a plurality of connecting rods connected to said crank shaft and to each of the holders at opposite ends thereof, whereby said holders are oscillated.

3. A raking machine comprising in combination a main frame, running wheels thereon, rearwardly extending supports, a plurality of holders pivotally mounted on said supports for movement in a horizontal plane, rake teeth secured to said holders, means for moving said holders in a horizontal plane, said rake teeth having aligned inclined recesses, and a rod spanning said rake teeth and positioned in said recesses for reinforcing said rake teeth.

In testimony whereof I affix my signature.

CARL CHRISTIAN ANDERSEN.